United States Patent [19]
Sakai et al.

[11] Patent Number: 5,539,585
[45] Date of Patent: Jul. 23, 1996

[54] APPARATUS FOR RECORDING AN INFORMATION SIGNAL IN A NORMAL RECORD MODE AND AN EDIT MODE

[75] Inventors: Seiichi Sakai, Tokyo; Mamoru Ueda, Kanagawa, both of Japan

[73] Assignee: Sony Corporation, Tokyo, Japan

[21] Appl. No.: 288,894

[22] Filed: Aug. 10, 1994

Related U.S. Application Data

[63] Continuation of Ser. No. 15,386, Feb. 9, 1993, abandoned.

[30] Foreign Application Priority Data

Feb. 8, 1993 [JP] Japan .................................. 4-059294

[51] Int. Cl.$^6$ ..................... G11B 27/036; G11B 27/031; H04N 5/7826
[52] U.S. Cl. ..................... 360/14.2; 360/13; 360/14.1; 360/77.13
[58] Field of Search ................................. 360/14.2–14.3, 360/27, 14.1, 77.01, 77.12, 77.14, 13, 31; 358/311, 320, 323

[56] References Cited

U.S. PATENT DOCUMENTS

| | | | |
|---|---|---|---|
| 4,443,823 | 4/1984 | Sakamoto | 360/14.1 X |
| 4,463,391 | 7/1984 | Takano et al. | 360/14.2 |
| 4,503,470 | 3/1985 | Mita et al. | 360/14.3 X |
| 4,554,602 | 11/1985 | Tobe | 360/14.2 |
| 4,799,111 | 1/1989 | Ito | 360/14.3 |
| 5,091,899 | 2/1992 | Adachi et al. | 360/14.3 X |
| 5,173,812 | 12/1992 | Reime | 360/14.1 |
| 5,274,873 | 12/1993 | Sakai et al. | 360/14.1 X |
| 5,395,067 | 3/1995 | Kano et al. | 360/77.12 X |
| 5,420,731 | 5/1995 | Thomas et al. | 360/77.12 X |

OTHER PUBLICATIONS

Dictionary of Computers, Information Processing, & Telecommunications 2d, Jerry M. Rosenberg, Ph.D, © 1987 John Wiley & Sons, p. 66.

*Primary Examiner*—Aristotelis Psitos
*Assistant Examiner*—Larry Cullen
*Attorney, Agent, or Firm*—William S. Frommer; Alvin Sinderbrand

[57] ABSTRACT

When a magnetic track is formed, the magnetic track is divided into a plurality of track areas in its longitudinal direction. Information signals are recorded in the divided track areas independently of each other. At a portion of the magnetic track, there is provided a reference track area in which a specific reference signal is recorded. When an information signal is recorded in either of the track areas, the reference signal is played back from the reference track area, and the information signal is recorded in the track area corresponding to the information signal using the played back reference signal as a reference for timing of the recording.

With the described arrangement, when a plurality of information signals are recorded in a plurality of track areas, which are formed by dividing a track in its longitudinal direction, independently of each other, a signal recorded in a track area is prevented from adversely affecting another signal recorded in a neighboring track area.

17 Claims, 9 Drawing Sheets

F I G. 1
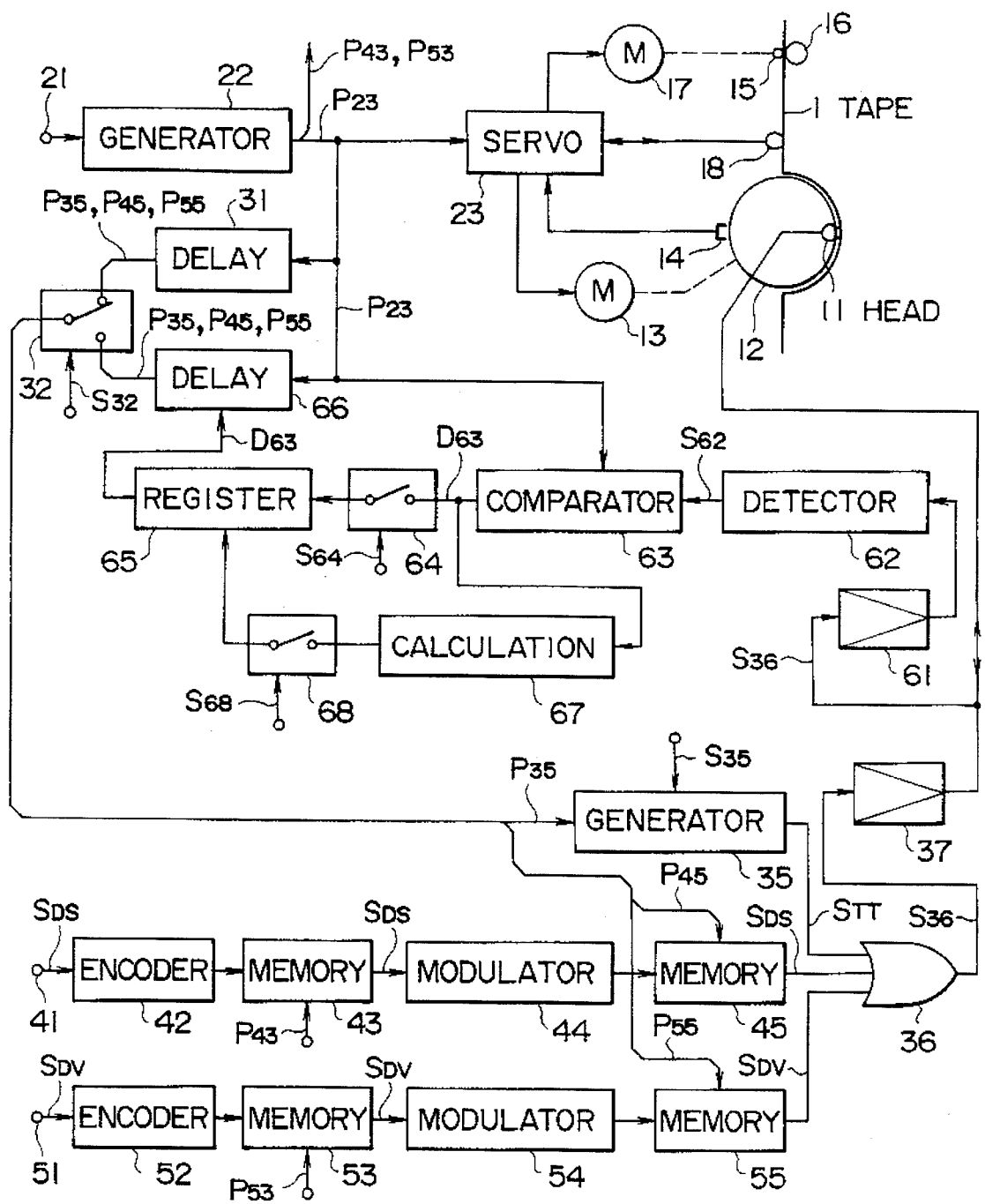

APPARATUS FOR RECORDING AN INFORMATION SIGNAL IN A NORMAL RECORD MODE AND AN EDIT MODE

This application is a continuation of application Ser. No. 08/015,386, filed Feb. 9, 1993, now abandoned.

BACKGROUND OF THE INVENTION

The present invention relates to an apparatus for recording an information signal using a rotating magnetic head, such as a VTR.

Since a video signal is recorded in a VTR as oblique magnetic tracks on a magnetic tape by a rotating magnetic head, it is required that tracking control be executed during the playback so that the rotating head correctly scans the video tracks.

For the tracking control, it is generally practiced that a control pulse is recorded in the recording at an edge portion of the magnetic tape by a stationary magnetic head at the rate of one pulse per revolution of the magnetic head and, in the playback, the travel of the tape, for example, is controlled such that the relationship between the played back control pulse and the rotational phase of the rotating head is kept identical to that in the recording. If servo control is executed in this way, the rotating head can correctly scan the video track.

In the modes of tape editing, there are an insert edit mode and an assemble edit mode. In either of the edit modes, the following steps are taken:

① to rewind the tape from the edit starting point a length corresponding, for example, to three seconds, ② to start playing back the tape from the rewound position, with the playback kept in synchronism with the newly recorded video signal in the editing, and ③ to switch the VTR from the playback mode to the record mode when the tape reaches the edit starting point, By following the above procedure, no disarray of the track is produced at the edit starting point and, hence, no disturbance in the played back picture is caused there.

In actual practice of the tape editing under the described servo control, sometimes trouble is caused in the results of editing.

FIG. 7 shows a track pattern in a digital VTR. Referring to FIG. 7, reference numeral 1 denotes a magnetic tape and 2 denotes a magnetic track which is obtained in the normal recording. The track 2 is divided along its length into a track area 2S and a track area 2V, with an edit gap 2G provided between the area 2S and the area 2V. In this case, a digital audio signal is recorded and played back on the track area 2S and a digital video signal is recorded and played back on the track area 2V. The edit gap 2G constitutes a recordless area, i.e., a guard interval, between the area 2S and the area 2V.

(In actual digital VTRs, a digital video signal is divided into a plurality of channels and signals for the plurality of channels are recorded in a tape in the form of a plurality of tracks by a plurality of rotating heads in an inline array or a staggered array rotating as one body. However, since such details are not related to the essence of the present invention, the digital video signal is treated herein, for simplicity, as one channel of signal.)

When there are some errors in adjustment of the rotating head or the driving system of the tape 1, a rolling phenomenon of the rotating head in the recording, or expansion or shrinkage of the tape 1, the track 2 sometimes deviates from the normal position of the track 2 as indicated by broken lines in FIG. 7.

If insert editing of an audio signal is performed when there is such a deviation of the track 2, especially when there is some deviation of the track 2 in its longitudinal direction, it sometimes occurs, for example as shown in FIG. 8, that the newly formed track area 2S in the insert editing (indicated by broken lines) erases the front end portion 2Y of the track area 2V. When the tape with its track in such a state is played back, the played back video signal becomes deteriorated because the signal component corresponding to the portion 2Y cannot be obtained and, hence, the played back picture becomes disturbed.

Similarly, in insert editing of a video signal, if a new track area 2V formed by the insert editing is shifted to the side of the track area 2S, it sometimes occurs that the new track area 2V erases the rear end portion of the track area 2S. When the tape with its track in such a state is played back, the played back audio signal becomes deteriorated because the signal component corresponding to the erased portion cannot be obtained.

Further, if assemble edit of both an audio signal and a video signal is performed when there is some deviation of the track 2, it sometimes occurs that the tracks 2, in each assemble editing, deviate from the right position in their longitudinal direction as shown in FIG. 9. When a track is formed at the edge portion of the tape where the scanning by the head becomes unstable, it is difficult to playback the video and audio signals in a stable manner and sometimes tracking errors are produced and, hence, the played back audio signal is deteriorated or the played back picture disturbed.

When insert editing is performed on the tape 1 having the track pattern as shown in FIG. 9, there are sometimes produced unerased areas 2X as shown in FIG. 10. Also from such a state of the tape, deterioration in the played back audio signal or disturbance in the played back picture is produced.

Of course, such a thing that the front end portion 2Y of the track area 2V is erased or the rear end portion of the track area 2S is erased in the insert editing of the audio signal or the video signal will not occur in the above cases if there is provided a sufficient length of edit gap 2G between the area 2S and the area 2V.

In that case, however, the edit gap 2G must be given a sufficient length to provide for the worst case and, hence, the utilization factor of the tape 1 become worse. Further, when a plurality of channels of audio signal are arranged to be recorded and played back independently of each other, it becomes necessary, while providing the track area 2S for each channel, to provide edit gaps 2G between the track areas 2S. Then, the utilization factor of the tape 1 will become still worse.

SUMMARY OF THE INVENTION

An object of the present invention is to provide an apparatus for recording information signal in which the above mentioned problems are solved and a method for realizing the apparatus.

To achieve the above object, there is provided in the present invention a track area 2T for tracking control which, for example as shown in FIG. 3, is positioned in the front portion of the track 2, and in the editing mode, a new digital audio signal or a new digital video signal is recorded as a track area 2S or a track area 2V in the right position referenced from the position of the track area 2T.

More specifically, in a recording apparatus in which it is adapted, with reference numerals of elements corresponding to those in the later described embodiment used, such that, when an information signal is recorded as oblique magnetic tracks 2 on a tape 1 with a rotating magnetic head 11, the magnetic track 2 is divided in its longitudinal direction into a plurality of track areas 2S and 2V and a plurality of information signals SDS and $S_{DV}$ are recorded in the divided track areas 2S and 2V independently of each other, a reference track area 2T for recording a specific reference signal $S_{TT}$ therein is provided at a portion of the magnetic track 2, and, when either of the information signals $S_{DS}$ and $S_{DV}$ is to be recorded in either of the plural track areas 2S and 2V, the reference signal $S_{TT}$ is played back from the reference track area 2T, and the information signal $S_{DS}$ or $S_{DV}$ is recorded in the corresponding track area of the plural track areas 2S and 2V using the played back reference signal $S_{TT}$ as a reference for the timing of recording.

Since, in the editing mode, the new information signal $S_{DS}$ or $S_{DV}$ is recorded in the track area 2S or 2V with the position of the track area 2T in the lengthwise direction of the track 2 taken as a reference, the recorded track area 2S or 2V can be correctly positioned with respect to the track area 2T at all times, and therefore, no track deviation is produced.

BRIEF DESCRIPTION OF THE DRAWINGS

FIG. 1 is a system diagram showing an example of the present invention;

DESCRIPTION OF THE PREFERRED EMBODIMENTS

Figure 2:
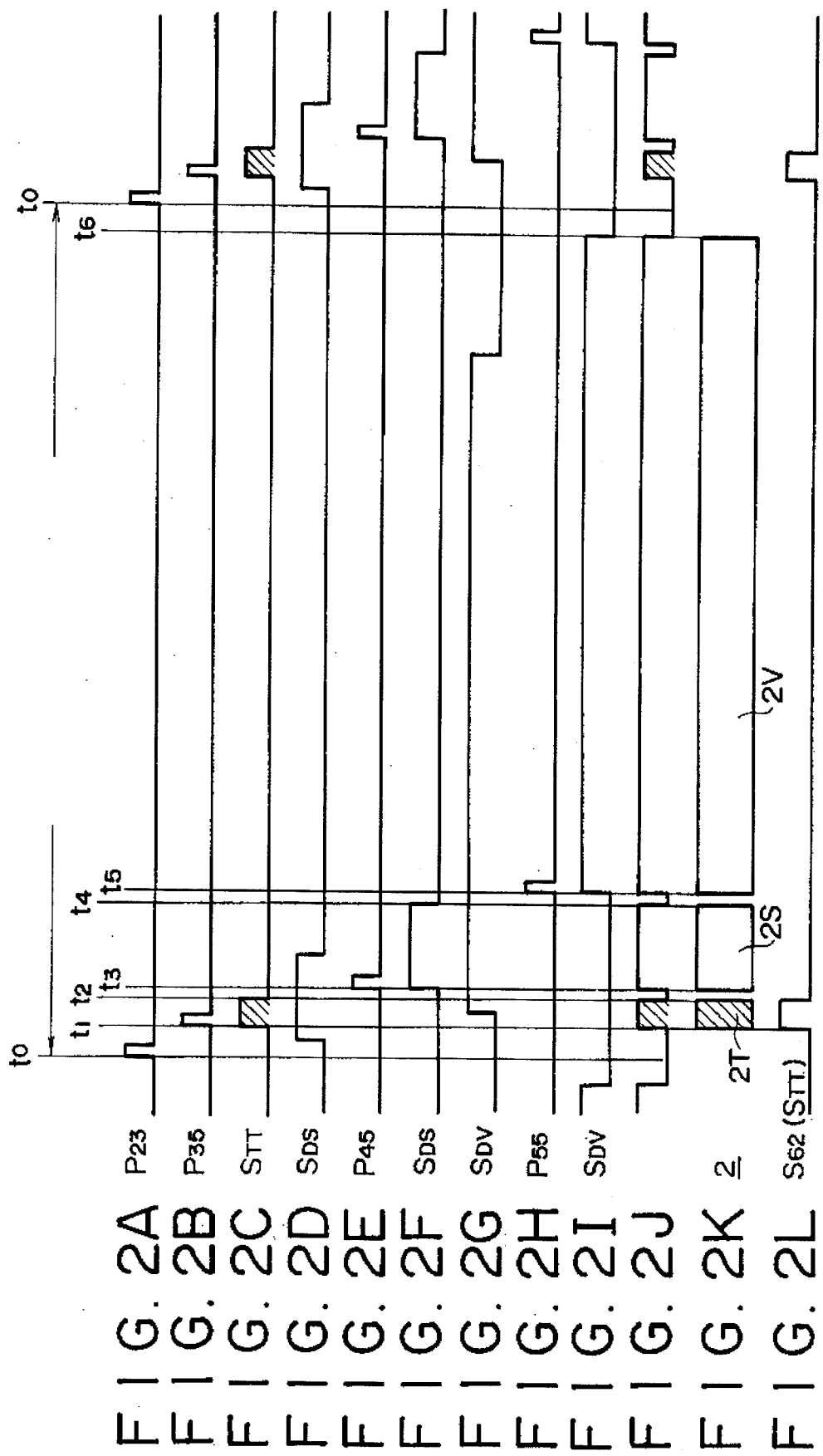
FIGS. 2A–2L are waveforms chart explanatory of the appratus of FIG. 1.

Referring to FIG. 1, reference numeral 11 denotes a rotating magnetic head, and this head 11, provided on a head drum 12, is rotated integrally with the drum 12 by a motor 13 for example at the field frequency. The drum 12 is provided with a pulse generator 14, whereby the rotational phase of the head 11 is picked up, and this pulse is supplied to a servo circuit 23. The motor 13 is driven by the servo circuit 23.

A magnetic tape 1 is arranged along the rotating peripheral surface of the head 11 and the drum 12 with a wrap angle for example of a little more than 180° and this tape 1 is driven by a capstan 15 and a pinch roller 16 to travel at a predetermined speed. Reference numeral 17 denotes a capstan motor 17 driven by the servo circuit 23. Reference numeral 18 denotes a stationary magnetic head, which is disposed to abut on an edge portion of the tape 1 and connected to the servo circuit 23.

A video signal serving as a reference for synchronization such as a station sync is supplied to a timing signal generator 22 through a terminal 21 and, thereby, a pulse P23, for example as shown in FIG. 2A, at the field period serving as the reference is generated and this pulse P23 is supplied to the servo circuit 23.

Thus, during the recording, the rotation of the head 11 is servo-controlled with the pulse P23 used as the reference, and at the same time, the pulse P23 is recorded as a control pulse by the head 18 at the edge portion of the tape 1. In the playback, the rotation of the head 11 and the travel of the tape 1 are servo-controlled with the pulse P23 used as the reference.

In the normal recording mode, the pulse P23 from the generator 22 is supplied to a delay circuit 31 and, therein, a pulse P35 which rises, for example as shown in FIG. 2B, at a point of time t1 a predetermined period after the point of time t0 is generated and this pulse P35 is supplied to a switching circuit 32. This switching circuit 32, at the time of normal recording, is connected as shown in FIG. 1, in accordance with a control signal S32 from a system controller (not shown).

Accordingly, the pulse P35 from the delay circuit 31 is delivered from the switching circuit 32. The pulse P35 therefrom is supplied to a generator 35 as the reference signal for timing and, at the same time, a control signal S35 from the system controller is supplied to the generator 35. Thus, when the switching circuit 32 is connected as shown in FIG. 1, the generator 35 generates a reference signal $S_{TT}$ as a reference for tracking which, for example as shown in FIG. 2C, is high during the period from the point of time t1, with the pulse P35 taken as the reference, to the point of time t2. This signal $S_{TT}$ is supplied to an OR circuit 36.

Further, a digital audio signal $S_{DS}$ is supplied, through an input terminal 41, to an encoder 42 and given therein an encoding treatment for error correction and the like. The encoded digital signal $S_{DS}$ is successively written into a memory circuit 43.

Furthermore, a predetermined pulse P43 in synchronism with the pulse P23 is taken out from the generator 22 and this pulse P43 is supplied to the memory circuit 43 as the starting signal of reading, and, thereby, for example as shown in FIG. 2D, a digital audio signal $S_{DS}$ compressed for the time base for a one-field period, which goes high at a predetermined point of time is read from the memory circuit 43. This signal $S_{DS}$ is supplied to a modulator 44 and given therein a modulation treatment for recording (data conversion). The modulated signal $S_{DS}$ is written into a second memory circuit 45.

The memory circuit 45 functions as a variable delay circuit for the signal $S_{DS}$ supplied thereto. At the time of normal recording, i.e., in the present case, the delay time is set to a fixed value. More specifically, for example as shown is FIG. 2E, a pulse P45, which rises at a point of time t3 a predetermined period after the point of time t0, is taken out from the delay circuit 31, and this pulse P45 is supplied, through the switching circuit 32, to the memory circuit 45 as the starting signal of reading, and, thereby, the signal $S_{DS}$ written in the memory circuit 45 is read, for example as shown in FIG. 2F, during the period from the point of time t3 to the point of time t4. The read signal $S_{DS}$ is supplied to the OR circuit 36.

Further, a digital audio signal $S_{DV}$ in synchronism with the video signal input to the terminal 21 is supplied, through an input terminal 51, to an encoder 52 and given therein an encoding treatment for error correction and the like. The encoded digital signal $S_{DV}$ is successively written into a memory circuit 53.

Furthermore, a predetermined pulse P53 in synchronism with the pulse P23 is taken out from the generator 22 and this pulse P53 is supplied to the memory circuit 53 as the starting signal of reading, and, thereby, for example as shown in FIG. 2G, a digital video signal $S_{DV}$ compressed for the time base for a one-field period, which goes high at a predetermined point of time is read from the memory circuit 53. This signal $S_{DV}$ is supplied to a modulator 54 and given therein a modulation treatment for recording. The modulated signal $S_{DV}$ is written into a memory circuit 55.

The memory circuit 55 also functions as a variable delay circuit for the signal $S_{DV}$ supplied thereto. At the time of normal recording, the delay time is set to a fixed value. More specifically, for example as shown in FIG. 2H, a pulse P55, which rises at a point of time t5 a predetermined period after the point of time t0, is taken out from the delay circuit 31, and this pulse P55 is supplied, through the switching circuit 32, to the memory circuit 55 as the starting signal of reading, and, thereby, the signal $S_{DV}$ written in the memory circuit 55 is read, for example as shown in FIG. 2I, during the period from the point of time t5 to the point of time t6. The read signal $S_{DV}$ is supplied to the OR circuit 36.

Accordingly, from the OR circuit 36, for example as shown in FIG. 2J, a recording signal S36 having the signals $S_{TT}$, $S_{DS}$ and $S_{DV}$ in succession for each one-field period is delivered.

Figure 3:
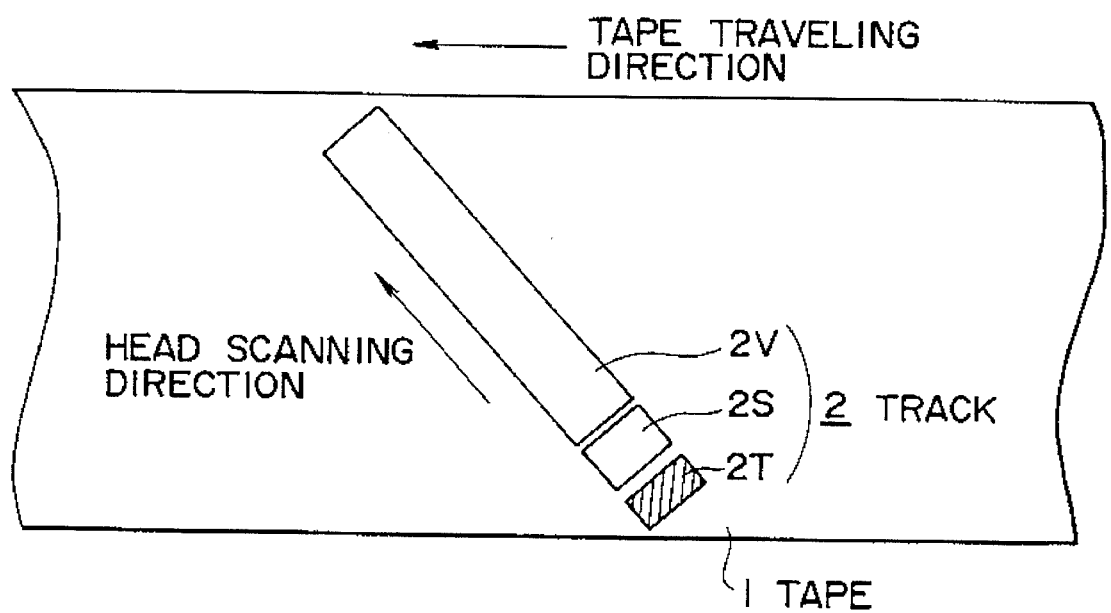
FIG. 3 is a diagram showing a track pattern.

The signal S36 is supplied to the rotating head 11 through a recording amplifier 37 and, thereby, the signal S36 is recorded on the tape 1 such that the signal for a one-field period is recorded, for example as shown in FIG. 2K and FIG. 3, as one oblique magnetic track 2. Since, at this time, the signal S36 for one field has the signals $S_{TT}$, $S_{DS}$, and $S_{DV}$ in succession as shown in FIG. 2J, the track 2 has the track area 2T formed by the signal $S_{TT}$ in the front, the track area 2S formed by the signal $S_{DS}$ in the next place, and the track area 2V formed by the signal $S_{DV}$ at the rear.

Thus, in the normal recording, the digital audio signal $S_{DS}$ and digital video signal $S_{DV}$ are recorded as the track areas 2S and 2V of the track 2, respectively, and in the front of the track 2, there is formed the track area 2T. At this time, the temporal positions of the signals $S_{TT}$, $S_{DS}$, and $S_{DV}$ recorded as the track areas 2T, 2S, and 2V are each set referenced from the pulse P23 and, hence, there is produced no deviation of the track areas 2T, 2S, and 2V in the longitudinal direction of the track 2.

Then, in the assemble edit mode, while the tape 1 is rewound for example by the length corresponding to three seconds from the edit starting point and the apparatus is then put into a playback state as described in ① and ② above, the scanning position of the head 11 (its scanning position in the lateral direction of the track 2) is servo controlled, though not shown, by the servo circuit 23 so that the level of the played back signal by the head 11 becomes a maximum, namely, the center of scanning of the head 11 coincides with the center of the track 2 in its lateral direction.

Further, during the period of ②, the switching circuit 32 is connected in the opposite state to that shown in FIG. 1 by the control signal S32, and at the same time, generation of the reference signal $S_{TT}$ in the generator 35 is inhibited.

Further, during the period of ②, signals $S_{TT}$, $S_{DS}$, and $S_{DV}$ are sequentially obtained from the head 11, by its scanning the track 2, for each one-field period and these signals $S_{TT}$–$S_{DV}$ are supplied to a detector circuit 62 through a playback amplifier 61 and, for example as shown in FIG. 2L, the signal $S_{TT}$ is detected therein. At this time, the period during which the signal $S_{TT}$ is detected is while the head 11 is scanning the track area 2T and, hence, the detection output S62 of the detector circuit 62 indicates the period during which the head 11 scans the track area 2T.

At this time, if there is none of the deviation produced in the scanning of the head 11 (the deviation in the scanning direction), a detection signal S62 is obtained, for example as shown in FIG. 2L, at the point of time t1, the same as the pulse P35, referenced from the pulse P23. More specifically, the phase (temporal position) of the detection signal S62 indicates a deviation in the scanning position of the head 11 (a deviation in the scanning direction) with respect to the track area 2T.

Then, the detection signal S62 of the detector circuit 62 is supplied to a phase comparator 63 and, at the same time, the pulse P23 from the generator 22 is supplied to the phase comparator 63, and a data signal D63 indicating the phase difference of the detection signal S62 with respect to the pulse P23 is taken out therefrom. This phase difference data D63 is loaded into a register 65 through a switching circuit 64. At this time, the switching circuit 64 is held on by a control signal S64 from the system controller and a switching circuit 68 is held off by a control signal S68 from the system controller.

When the tape 1 reaches the edit starting point, the generator 35 is permitted to output the reference signal $S_{TT}$ controlled by the control signal S35.

At the same time, the switching circuit 64 is turned off by the control signal S64 and, thereby, the phase difference data D63 of the detection signal S62 in the track 2 immediately before the edit starting point is retained in the register 65.

Meanwhile, the pulse P23 from the generator 22 is supplied to a variable delay circuit 66 and pulses P35, P45, and P55 for use in the editing are generated therein. The pulse P35 is supplied to the generator 35 through the switching circuit 32 as the reference signal for timing and also the pulses P45 and P55 are supplied to the memory circuits 45 and 55 through the switching circuit 32 as the starting signals of reading.

At this time, however, the phase difference data D63 retained in the register 65 is supplied to the delay circuit 66 as the control signal therefor and, thereby, the phases of the pulses P35–P55 from the delay circuit 66 are controlled so that the phase differences between the detection signal S62 (FIG. 2L) and the pulses P35–P55 from the delay circuit 66 become identical to the phase differences between the pulse P35 at the time of recording (FIG. 2B) and the pulses P35–P55 from the delay circuit 31.

Thus, while the reference signal $S_{TT}$ is taken out from the generator 35, signals $S_{DS}$ and $S_{DV}$ are read from the memory circuits 45 and 55, and these signals $S_{TT}$, $S_{DS}$, and $S_{DV}$ are supplied to the rotating head 11 through the OR circuit 36 and the recording amplifier 37.

Accordingly, new signals $S_{TT}$, $S_{DS}$, and $S_{DV}$ are recorded in the tape 1 from the edit starting point as track areas 2T, 2S, and 2V. Thus, the assemble editing is performed.

Figure 9:
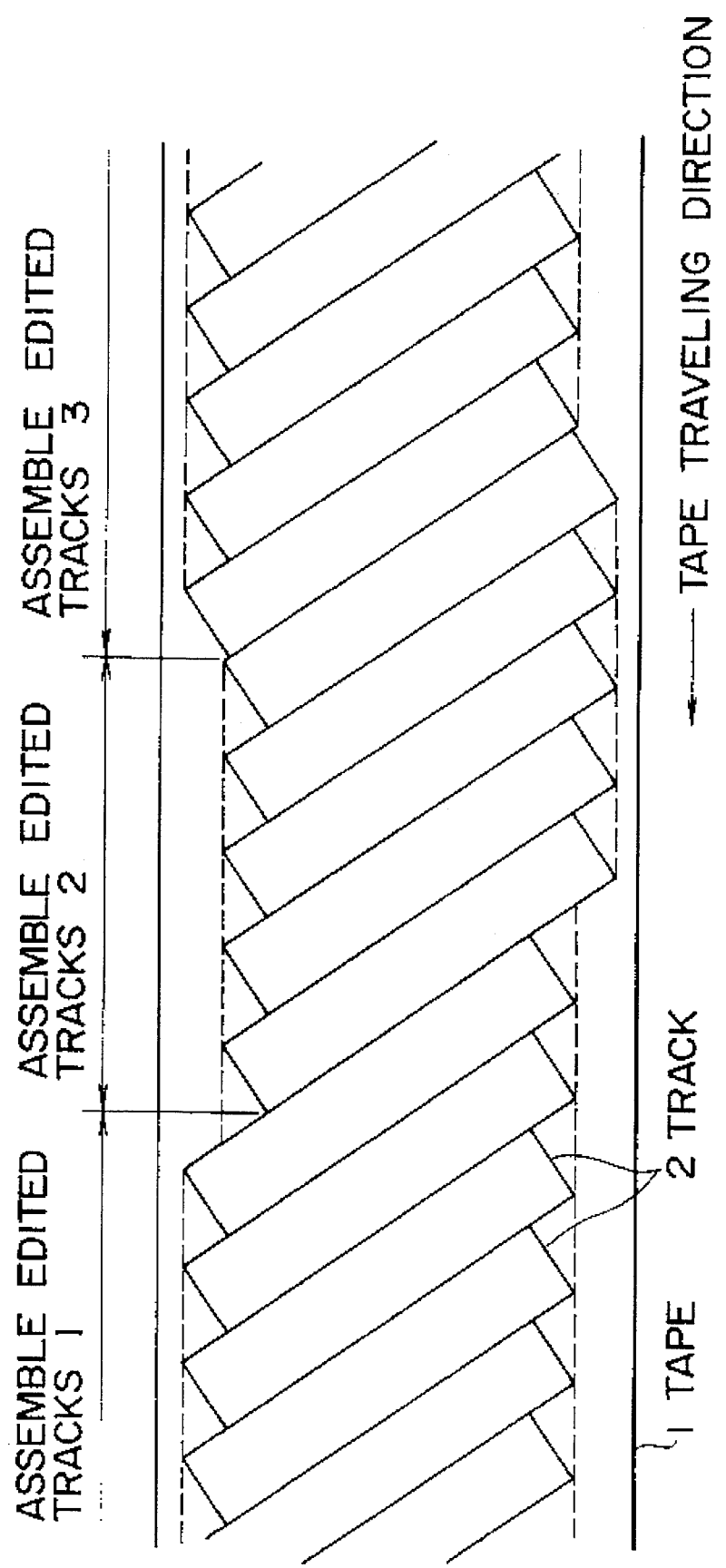
FIG. 9 is a diagram showing an example of tracking error.
Figure 10:
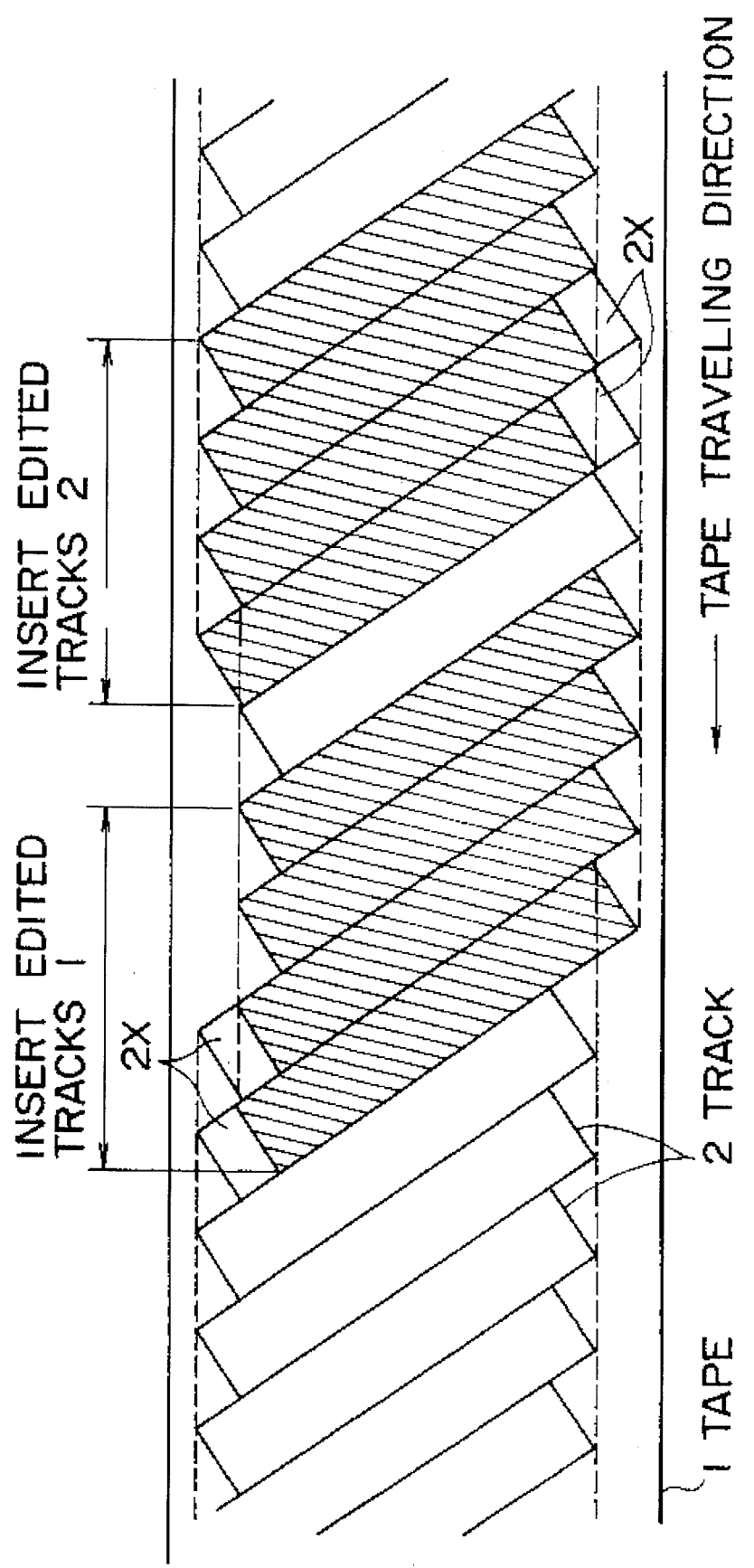
FIG. 10 is a diagram showing an example of results of editing.

Since, in this case, the signals $S_{TT}$, $S_{DS}$, and $S_{DV}$ are formed referenced from the track area 2T in the track 2 at the point immediately before the edit starting point, the new track 2 along which the new signals $S_{TT}$, $S_{DS}$, and $S_{DV}$ are recorded is formed such that the position of the track 2 in its longitudinal direction is kept identical to that of the old track 2 immediately before the edit starting point with respect to the track area 2T, no deviation as shown in FIG. 9 is produced.

Figure 4:
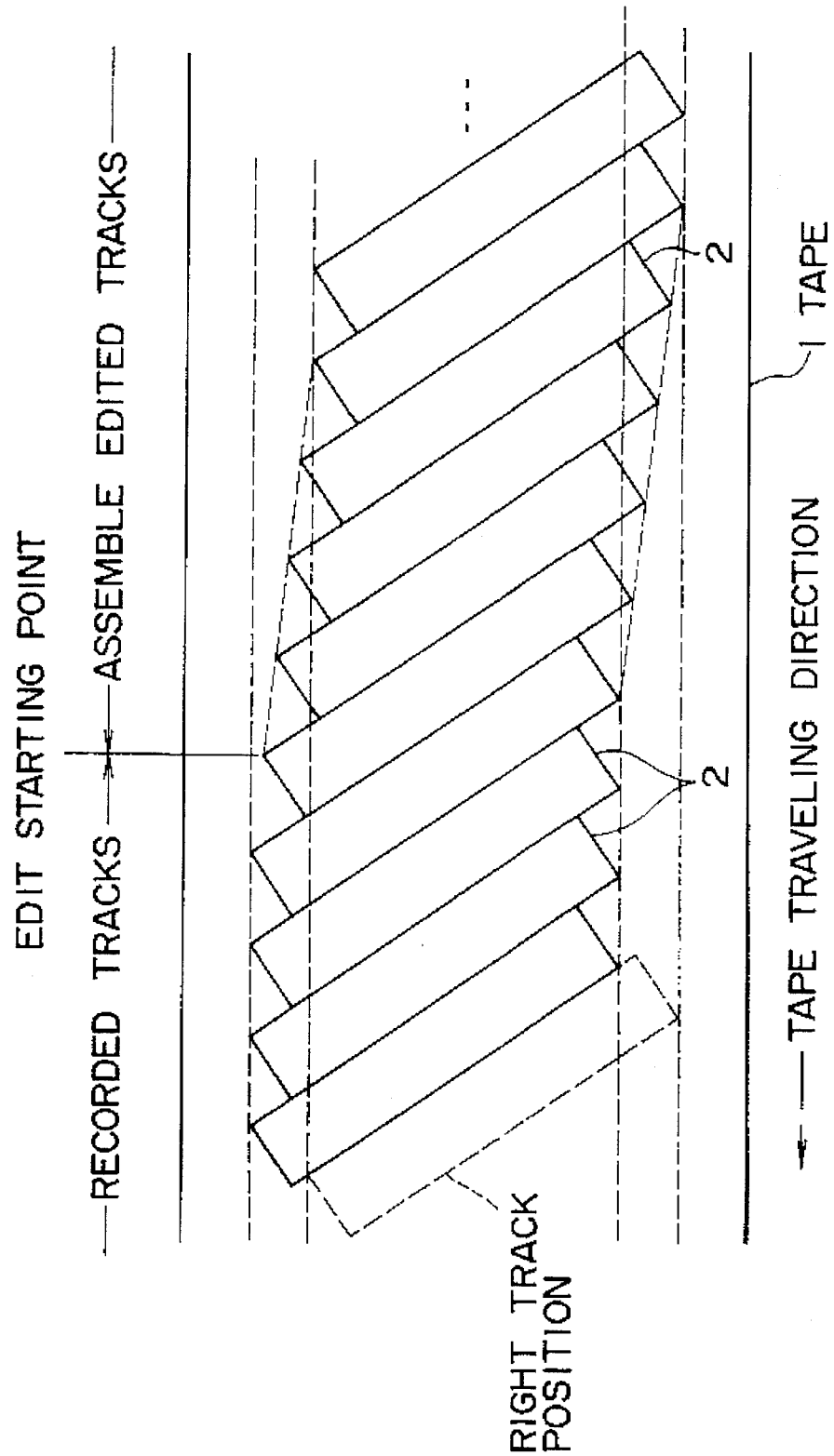
FIG. 4 is a diagram showing an example of track pattern.

The embodiment shown in FIG. 1 can also be arranged, when, in the assemble edit mode, an old track 2 before the edit starting point is so much shifted, for example as shown in FIG. 4, to the edge portion of the tape as to exceed a specified point, such that the tracks newly recorded after the edit starting point are gradually adjusted to the right position as shown in the same figure.

More specifically, the phase difference data D63 from the comparator 63 is supplied to a calculation circuit 67 and, therein, it is detected from the value of the data D63 whether or not the magnitude of the deviation of the old track 2 (the deviation in the longitudinal direction of the track 2) before the edit starting point is over the specified value. When it is over the specified value, correction data D67 is output from the calculation circuit 67 and this correction data D67 is supplied to the register 65 through the switching circuit 68.

In the register 65, the value of the phase difference data D63 retained therein is gradually changed or corrected according to the correction data D67 and, thereby, the phases of the pulses P35–P55 output from the variable delay circuit 66 are gradually changed. Namely, such correction data D67 is output from the calculation circuit 67 that causes the delay amounts in the variable delay circuit 66 to gradually approach the delay amounts in the delay circuit 31. Accordingly, the track position while the reference signal $S_{TT}$ is output from the generator 35 and the track positions while the audio signal $S_{DS}$ and the video signal $S_{DV}$ are read are gradually changed. As a result, when new tracks 2 are recorded in the tape 1 from the edit starting point, the positions of the tracks 2 are gradually brought to the right position for example as shown in FIG. 4.

Figure 5:
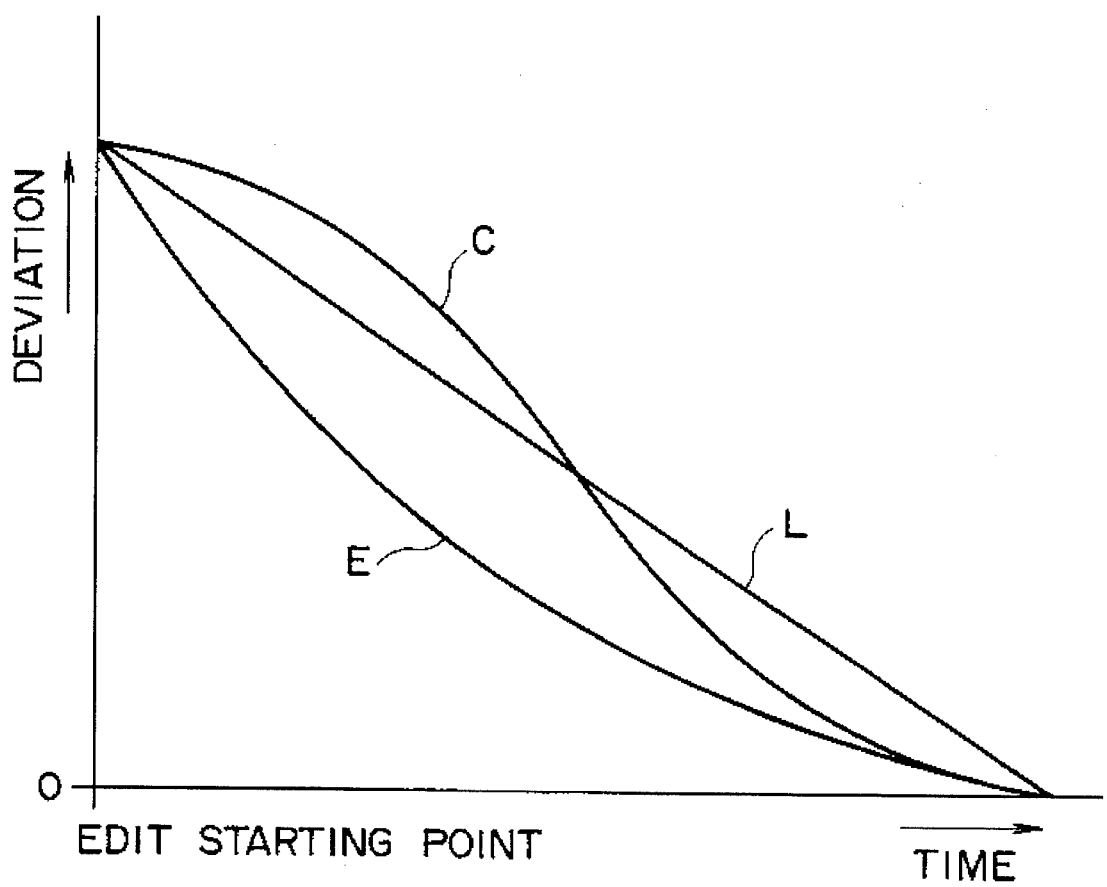
FIG. 5 is a diagram showing examples of correcting characteristics.

The amount of correction made when the track position is changed, i.e., the deviation from the right track position can be arranged to vary for example as shown in FIG. 5, namely, to vary linearly (indicated by the straight line L), to vary exponentially (indicated by the curve E), or to vary as a cosine function (indicated by the curve C).

Assemble editing of the digital audio signal $S_{DS}$ and digital video signal $S_{DV}$ can be achieved in the manner as described above.

In the insert edit mode, similar operations to those in the above assemble edit mode are performed. However, when a new digital audio signal $S_{DS}$ and a new digital video signal $S_{DV}$ are recorded in the tape 1 in the insert edit mode (during the period ③ above), the switching circuit 64 is held on and the switching circuit 68 is held off, while the switching circuit 32 is connected to the opposite side to that shown in FIG. 1, and the operation of the generator 35 is inhibited and the reference signal $S_{TT}$ is not supplied to the OR circuit 36. Accordingly, a new audio signal and a new video signal $S_{DV}$ are recorded from the edit starting point with the position of the old track area 2T used as the reference.

Also in the case where only one of the digital audio signal $S_{DS}$ and the digital video signal $S_{DV}$ is edited in the insert mode, the switching circuit 64 is held on and the switching circuit 68 is held off, while the switching circuit 32 is connected to the opposite side to that shown in FIG. 1 when the new digital audio signal $S_{DS}$ or digital video signal $S_{DV}$ is recorded in the tape 1, and the operation of the generator 35 is inhibited and the reference signal $S_{TT}$ is not supplied to the OR circuit 36. Accordingly, the new audio signal $S_{DS}$ or the new video signal $S_{DV}$ is recorded from the edit starting point with the position of the old track area 2T used as the reference.

Thus, according to the present invention, the track area 2T is provided in the front of the track 2 and it is adapted, in the editing, such that an audio signal $S_{DS}$ or a video signal $S_{DV}$ is recorded in the subsequent track area 2S or track area 2V referenced from the track area 2T, and, hence, the edit gap 2G between the track area 2S where the audio signal $S_{DS}$ is recorded and the track area 2V where the video signal $S_{DV}$ is recorded can be made sufficiently small. Therefore, the utilization factor of the tape 1 or the recording density in the tape 1 can be increased.

Further, since the track area 2S or the track area 2V for the audio signal $S_{DS}$ or the video signal $S_{DV}$ is formed referenced from the track area 2T in the editing, it does not occur that the newly recorded audio signal $S_{DS}$ or video signal $S_{DV}$ erases the track area 2V or 2S of the other signal even when the edit gap 2G is small. Therefore, a normal audio signal or video signal which is not deteriorated can be played back.

Furthermore, when the new tracks 2 after the edit starting point are formed in the manner shown in FIG. 4 and FIG. 5, the new tracks 2 are formed in the right position, namely, the tracks 2 are prevented from being formed at the edge portion of the tape where the scanning of the head 11 becomes unstable. Therefore, the video signal $S_{DV}$ or the audio signal $S_{DS}$ can be played back in a stable manner. Since, when assemble editing is repeated, it does not occur that the deviations of the track 2 accumulate, satisfactory editing can be achieved.

Figure 6:
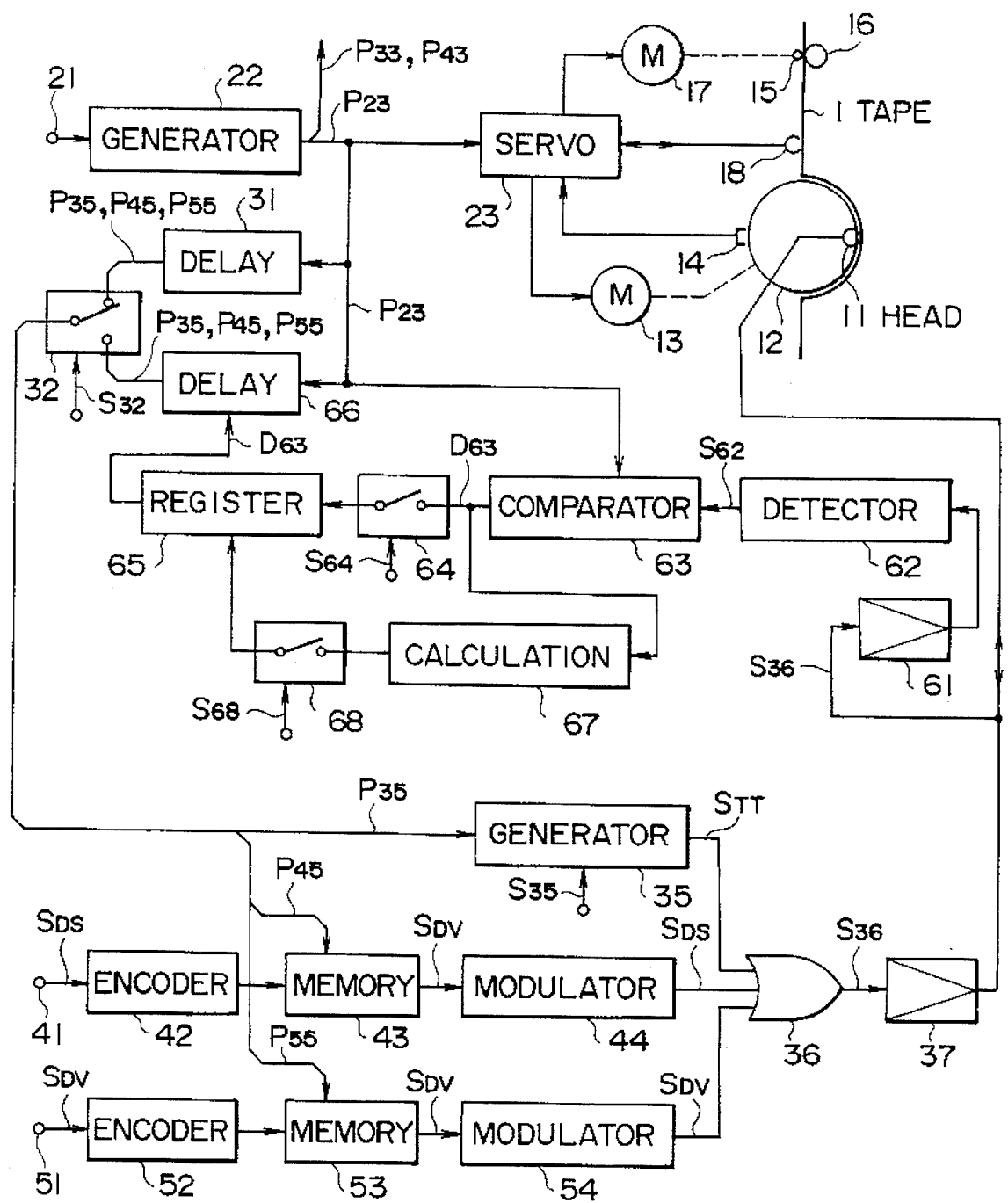
FIG. 6 is a system diagram showing another example of the present invention.
Figure 7:
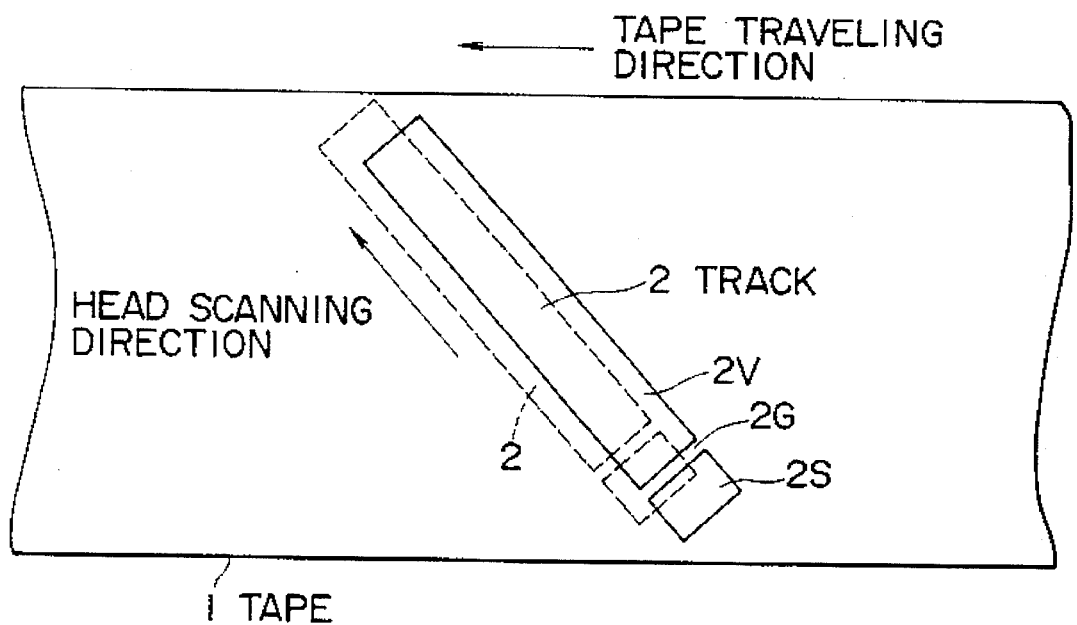
FIG. 7 is a diagram explanatory of a tracking error.
Figure 8:
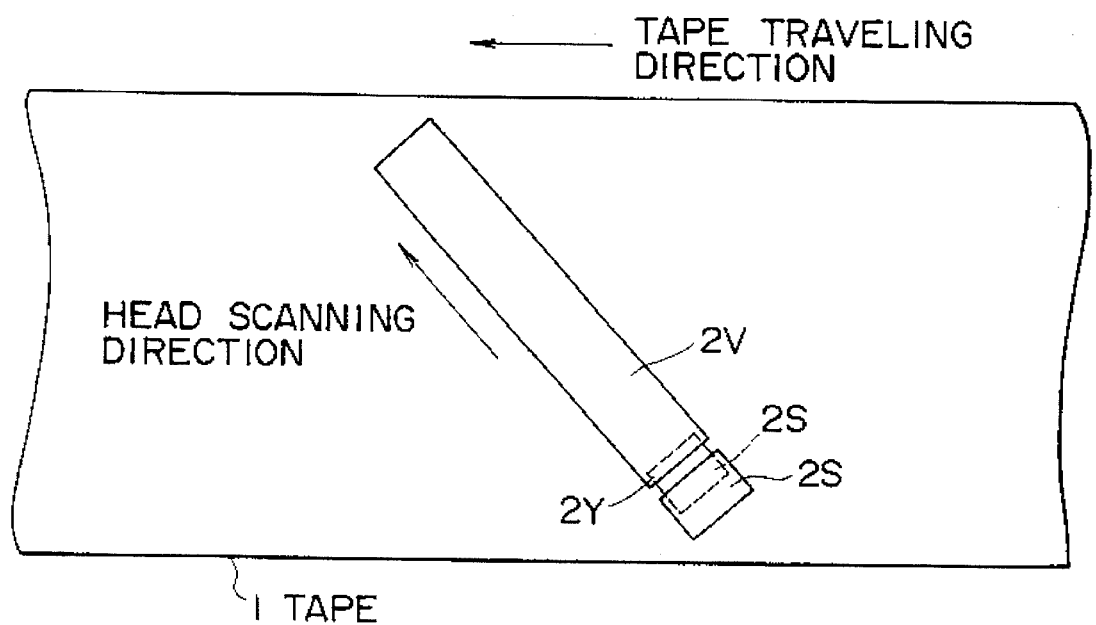
FIG. 8 is a diagram explanatory of a tracking error.

FIG. 6 shows another embodiment of the present invention. In this embodiment, the memory circuits 43 and 53 are adapted to concurrently serve as memory circuits 45 and 55, respectively. More specifically, in the editing, the timing to read the signal $S_{DS}$ or $S_{DV}$ from the memory circuits 43 or 53 is controlled so that the track areas 2S or 2V is formed in the right position with respect to the track area 2T.

Although the present invention has been described above as related to the case where one track 2 is divided in two track areas 2S and 2V and the audio signal $S_{DS}$ and video signal $S_{DV}$ are recorded therein, respectively, the present invention can be applied to any apparatus using a rotating magnetic head for recording signals in which one track 2 is divided, in its longitudinal direction, into a plurality of track areas and information signals are recorded in the track areas independently of each other.

Further, the track area 2T for recording the reference signal $S_{TT}$ therein can be formed in another position in the track 2. For example, two track areas 2T can be formed at the front end and at the rear end of the track 2. Furthermore, the reference signal $S_{TT}$ can be arranged to be an alternating signal at a fixed frequency and at a fixed level or to be a signal with a predetermined bit pattern.

What is claimed is:

1. Apparatus for recording an information signal by forming oblique tracks on a tape using a rotating magnetic head and having a normal record mode in which said information signal and a timing signal are recorded in oblique tracks, and an insert edit mode in which an information signal is recorded in place of a previously recorded information signal in specific tracks of the oblique tracks already formed on said tape, comprising:

a rotating record head for recording said information signal on said tape;

a rotating playback head for reproducing a previously recorded information signal from said tape to produce a reproduced signal;

servo means for controlling rotations of said record head and said playback head and for controlling a movement of said tape;

means for receiving a reference signal;

timing signal generator means for generating a timing signal to be recorded in said normal mode and which has a predetermined pattern;

detector means for detecting a timing signal included in said reproduced signal;

normal record mode control means operative, in the normal record mode, for supplying said information signal and the timing signal generated by said timing signal generator means to said record head to be recorded at a timing in accordance with said reference signal; and insert edit mode control means operative, in said insert edit mode, for supplying said information signal without the timing signal generated by said timing signal generator means to said record head and for timing, in a longitudinal direction along said specific tracks, the resulting recording of said information signal in said specific tracks in accordance with the timing signal detected by said detector means from the reproduced signal reproduced by said playback head from said specific tracks so as to prevent a longitudinal deviation of said recorded information signal in said specific tracks relative to a location of said reproduced signal in said specific tracks.

2. The apparatus according to claim 1, wherein each of said tracks is divided in a longitudinal direction into a plurality of track areas and said information signal and said timing signal are recorded in different ones of said plurality of track areas.

3. The apparatus according to claim 2, wherein said information signal is formed of a video signal and an audio signal and said video signal and said audio signal are recorded in separate track areas.

4. The apparatus according to claim 2, wherein each of said tracks is formed such that a gap at which no signal is recorded is formed between adjoining track areas of said plurality of track areas.

5. The apparatus of claim 1, wherein said insert edit mode control means is operable to time the resulting recording of said information signal in said specific tracks in accordance with a time of occurrence of said timing signal in said reproduced signal reproduced by said playback head from said specific tracks.

6. Apparatus for recording an information signal in an oblique track on a tape in a normal record mode and in an edit mode in which said information signal is recorded in a new track located after a previously recorded track in which a previously recorded information signal is recorded, comprising:

means for receiving a reference signal;

means for generating a timing signal having a predetermined pattern;

recording means operable to record said information signal and said timing signal in an oblique track on said tape in said normal record mode and said edit mode;

reproducing means operable to reproduce said previously recorded information signal and a previously recorded timing signal from a previously recorded track on said tape in said edit mode;

normal record mode control means operative in said normal record mode for controlling said recording means to record said information signal and said timing signal at a time in accordance with said reference signal;

edit mode control means operative in said edit mode for controlling said reproducing means to reproduce said previously recorded timing signal from said previously recorded track on said tape at a position before an edit starting position and for controlling said recording means to begin recording said information signal and said timing signal on said tape at said edit starting position at an edit time in accordance with said previously recorded timing signal reproduced at said position before said edit starting position so as to prevent a longitudinal deviation of said track recorded in said edit mode relative to a location of said previously recorded track; and correction means for successively varying said edit time to cause a longitudinal position of said track recorded in said edit mode to approach a longitudinal position of said track recorded in said normal record mode.

7. The apparatus of claim 6, wherein said means for receiving said reference signal includes delay means for delaying said reference signal by a predetermined amount to produce a delayed reference signal and wherein said normal record mode control means controls said recording means to record said information signal and said timing signal at a time in accordance with said delayed reference signal in said normal record mode.

8. The apparatus of claim 7, wherein said correction means comprises:

means for detecting a phase difference between said reference signal and said previously recorded timing signal; and second delay means for delaying said reference signal in accordance with said phase difference and correction data to produce a second delayed reference signal, and wherein said edit mode control means controls said recording means to record said information signal and said timing signal at a time in accordance with said second delayed reference signal in said edit mode and wherein said correction means is operable to successively vary a time of occurrence of said second delayed reference signal to approach a time of occurrence of said delayed reference signal.

9. The apparatus of claim 8, further comprising means for generating first and second timing signals whose phases are in a predetermined relationship with each other in accordance with the reference signal and wherein the first-mentioned delay means delays said first and second timing signals to produce delayed first and second timing signals, said normal record mode control means controls said recording means to record said information signal and said timing signal at times in accordance with said delayed first and second timing signals, respectively, in said normal record mode, said second delay means delays said first and second timing signals to produce second delayed first and second timing signals and said edit mode control means controls said recording means to record said information signal and said timing signal at times in accordance with said second delayed first and second timing signals, respectively, in said edit mode.

10. The apparatus of claim 8, wherein said correction means provides said correction data only when said phase difference exceeds a predetermined value.

11. The apparatus of claim 6, further comprising memory means for storing said information signal to be recorded and supplying said information signal as an output and wherein said normal record mode control means controls said recording means to record said information signal supplied from said memory means in said normal record mode and wherein said edit mode control means controls said recording means to record said information signal supplied from said memory means in said edit mode.

12. The apparatus of claim 6, wherein the track has a plurality of tracks areas in a longitudinal direction and wherein said recording means records said information signal and said timing signal in different ones of said plurality of track areas.

13. The apparatus of claim 12, wherein said information signal includes a video signal and an audio signal, and wherein said recording means records said video signal and said audio signal in different track areas of said plurality of track areas.

14. The apparatus of claim 12, wherein said recording means records said information signal and said timing signal in different track areas such that a gap containing no recorded information is formed between said different track areas.

15. The apparatus of claim 6, wherein the recording means is a rotating record head and the reproducing means is a rotating playback head.

16. The apparatus of claim 15, further comprising servo means for controlling rotations of the record head and the playback head and for controlling a tape speed of the tape.

17. The apparatus of claim 16, wherein said servo means controls rotations of the record head and the playback head in accordance with said reference signal.

* * * * *

UNITED STATES PATENT AND TRADEMARK OFFICE
CERTIFICATE OF CORRECTION

PATENT NO.   : 5,539,585
DATED        : Jul. 23 1996
INVENTOR(S)  : Seiichi Sakai, Mamoru Ueda It is certified that error appears in the above-indentified patent and that said Letters Patent is hereby corrected as shown below:

On the title page, item [30] should read as follows:

[30]      Foreign Application Priority Data

February 13, 1992    [JP]    Japan...............4-059294

Signed and Sealed this

First Day of October, 1996

*Attest:*

BRUCE LEHMAN

*Attesting Officer*       *Commissioner of Patents and Trademarks*